J. H. BUFFALOE.
COMBINED LISTER AND FERTILIZER DISTRIBUTER.
APPLICATION FILED SEPT. 25, 1914.
1,168,158.
Patented Jan. 11, 1916.
2 SHEETS—SHEET 1.
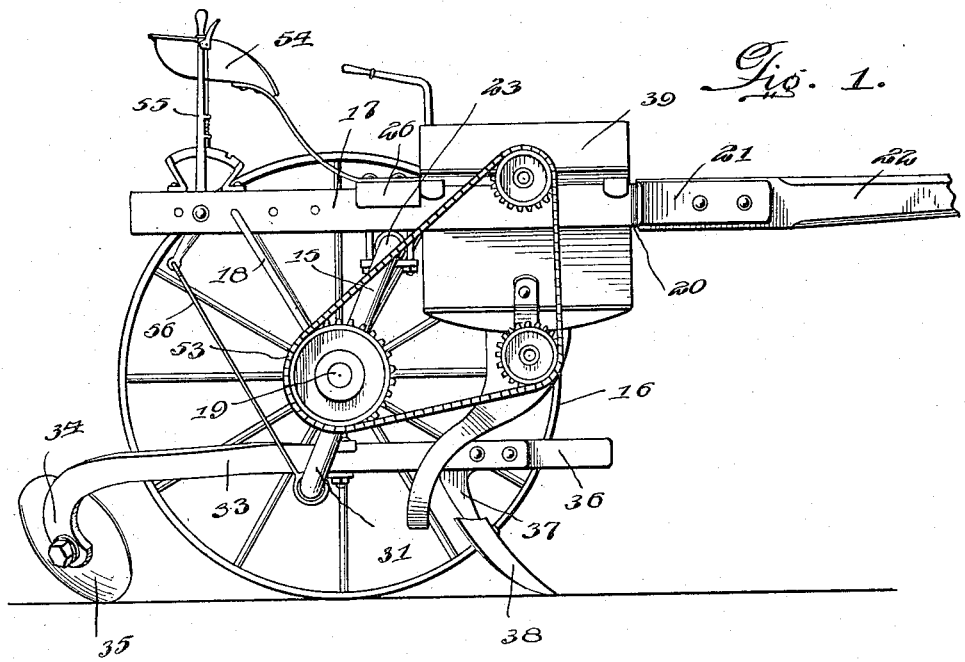
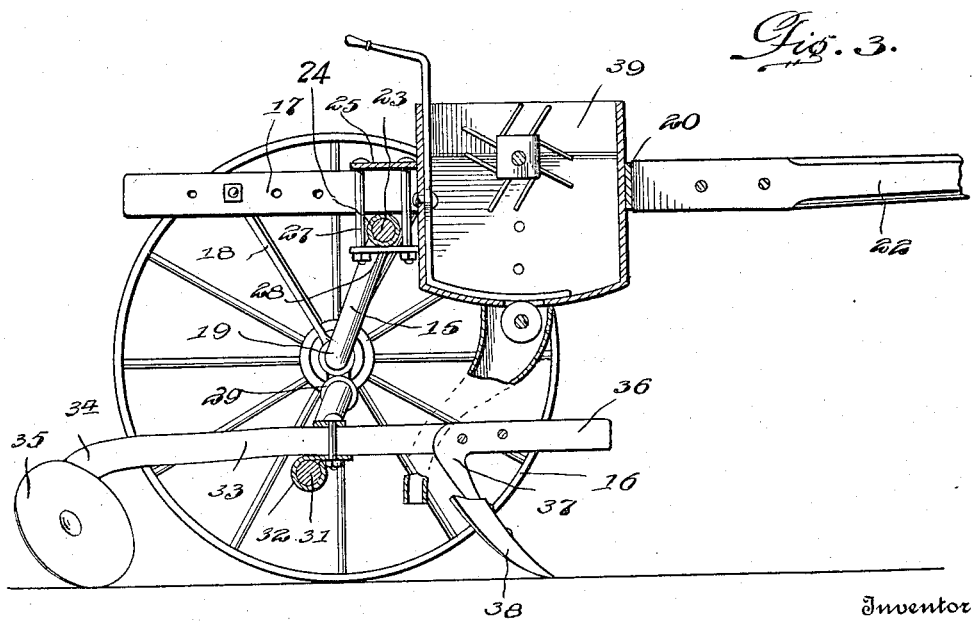
Witnesses
Frederick L. Fox.
Wm. Dagger.
Inventor
Joseph H Buffaloe
By Victor J. Evans.
Attorney J. H. BUFFALOE.
COMBINED LISTER AND FERTILIZER DISTRIBUTER.
APPLICATION FILED SEPT. 25, 1914.
1,168,158.
Patented Jan. 11, 1916.
2 SHEETS—SHEET 2.
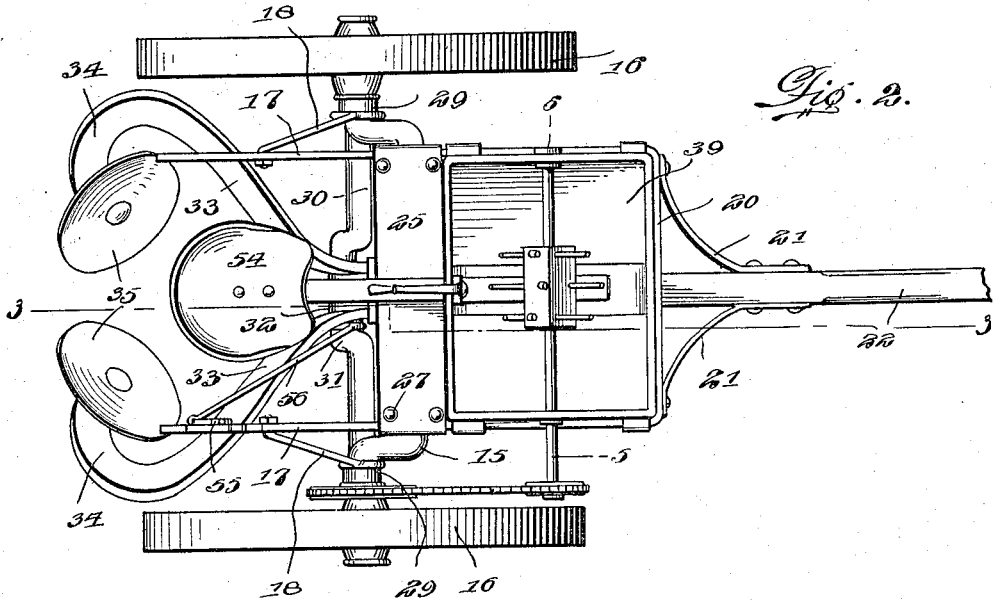
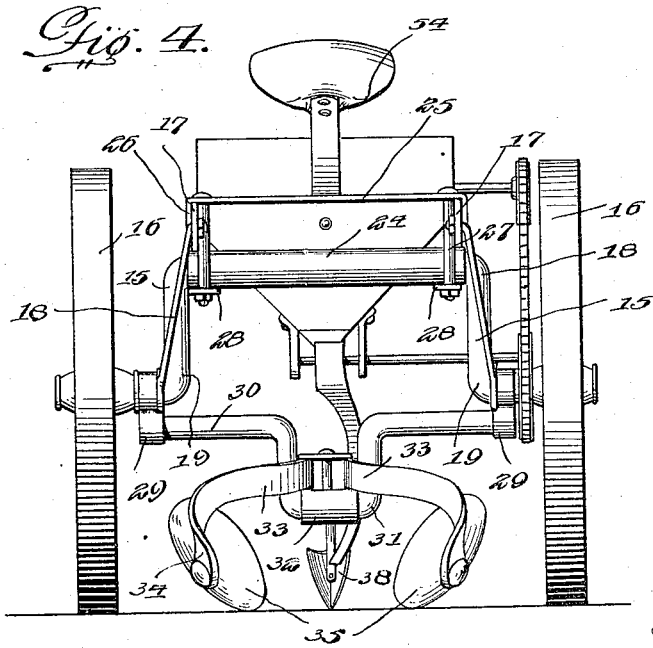
Inventor
Joseph H. Buffaloe.
Witnesses
Frederick L. Fox.
Wm. Dagger.
By Victor J. Evans.
Attorney

UNITED STATES PATENT OFFICE.

JOSEPH H. BUFFALOE, OF HUNTSVILLE, ALABAMA.

COMBINED LISTER AND FERTILIZER-DISTRIBUTER.

1,168,158.          Specification of Letters Patent.          Patented Jan. 11, 1916.

Application filed September 25, 1914. Serial No. 863,539.

*To all whom it may concern:*

Be it known that I, JOSEPH H. BUFFALOE, a citizen of the United States, residing at Huntsville, in the county of Madison and State of Alabama, have invented new and useful Improvements in Combined Listers and Fertilizer-Distributers, of which the following is a specification.

This invention relates to a combined lister and fertilizer distributer, and it has for its object to produce an organized machine of this class which will be simple in construction and efficient in operation.

A further object of the invention is to produce a machine of the class described embodying a simple and improved frame structure mounted on supporting wheels and carrying furrow opening means and listing disks, together with means for adjusting the same.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a machine constructed in accordance with the invention, the near supporting wheel having been removed. Fig. 2 is a top plan view. Fig. 3 is a longitudinal vertical sectional view taken on the line 3—3 in Fig. 2. Fig. 4 is a rear elevation.

Corresponding parts in the several figures are denoted by like characters of reference.

The arched axle 15 of the machine is mounted on transporting wheels 16, and the arch of the axle supports a frame composed of side members 17, said side members being connected by means of braces 18 with the spindles 19 of the axle so as to prevent the frame from tipping or tilting with respect to the axle arch. The forward ends of the side members 17 are connected together by a cross bar 20, and forwardly convergent braces 21 are provided to hold securely between them the tongue 22. The axle arch 23 has been shown as being provided with a tubular sleeve 24 with which the frame members 17 are connected by means of a clip plate 25 having downturned end flanges 26 spanning the side members 17 and bolts 27 extending through said clip plate and through washer plates 28 abutting upon the underside of the sleeve 24; the sleeve 24 being loose on the axle arch will permit the top frame to rock to various adjustments, the braces 18 being utilized to secure the parts in adjusted position.

Mounted on the spindles 19 adjacent to the inner ends of the hubs of the transporting wheels are bearing members 29 supporting a rock shaft 30 which is provided intermediate the ends thereof with a crank 31. Journaled on the crank 31 is a sleeve or bearing member 32 with which a pair of beams 33 are connected rigidly, said beams diverging rearwardly, and each being provided with a downturned portion or standard 34 on which a listing disk 35 is mounted for rotation. Secured rigidly between the forward ends of the beams 33 is a plow stock 36 having a standard 37 on which a furrow opener 38 may be secured.

On the top frame of the machine there is mounted a hopper 39 adapted to contain fertilizing material. Mechanism has also been shown for distributing such fertilizing material by power derived from one of the transporting wheels, but such mechanism will not be herein claimed or described in detail.

A seat 54 for the operator is mounted on the side members of the top frame in rear of the clip plate 25, and within convenient reach of the operator there is fulcrumed a lever 55 on one of the side members 17, one arm of said lever, which latter is preferably of the bell crank type, being connected by a rod 56 with the crank 31 of the rock shaft 30, thus enabling said rock shaft to be oscillated for the purpose of raising or lowering the ends of the beams carrying the listing disks. The latter may thus be conveniently moved into ground engaging position or to an inoperative position, as may be required.

From the foregoing description, taken in connection with the drawings, it will be seen that I have produced a simple and thoroughly efficient implement by means of which a furrow may be opened, fertilizing material deposited therein, and the row listed, all at one operation, and by the use of a single team and one operator; the same work having hitherto required the use of at least three horses and three operators when performed in the customary manner. The time and labor saving qualities of this device will, therefore, be readily appreciated.

Having thus described the invention, what is claimed as new, is:—

1. In a machine of the class described, an arched axle having supporting wheels, a sleeve mounted on the axle arch, a top frame including side members supported on the sleeve, a clip plate straddling the side members and having downturned end flanges, bolts extending through the clip plate, washer plates mounted on the bolts and bearing against the underside of the sleeve, and braces connecting the side members of the top frame with the axle spindles.

2. In a machine of the class described, an arched axle having supporting wheels, a top frame mounted on the axle arch, bearing members supported on the spindles of the axle, a rock shaft mounted for oscillation in the bearing members and having a crank intermediate the ends thereof, a sleeve mounted on the crank, beams connected with said sleeve and having rearwardly divergent ends with downwardly extending standards, lister disks mounted for rotation on the standards, a hand lever mounted on a side member of the top frame, and a rod connecting one arm of said hand lever with the crank of the rock shaft; and a plow stock secured between the forward ends of the beams, said beams being spaced apart for the admission of the plow stock.

In testimony whereof I affix my signature in presence of two witnesses.

JOSEPH H. BUFFALOE.

Witnesses:
W. B. SMITH,
D. E. KELLY.

Copies of this patent may be obtained for five cents each, by addressing the "Commissioner of Patents Washington, D. C."